Figure 1:
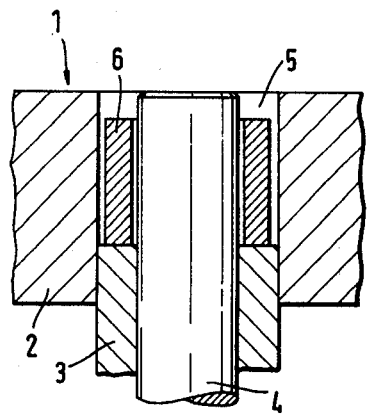

United States Patent [19]

Schaeffler et al.

[11] 4,450,704
[45] May 29, 1984

[54] METAL SLEEVE PRODUCTION

[75] Inventors: Georg Schaeffler; Karl Spiess, both of Herzogenaurach; Jürgen E. Heyne, Saarbrücken; Manfred Krost, Kaiserslautern, all of Fed. Rep. of Germany

[73] Assignee: Motomak Motorenbau, Maschinen- Und Werkzeugfabrik, Konstruktionen GmbH, Fed. Rep. of Germany

[21] Appl. No.: 461,636

[22] Filed: Jan. 27, 1983

[30] Foreign Application Priority Data

Feb. 2, 1982 [DE] Fed. Rep. of Germany ....... 3203438

[51] Int. Cl.³ .............................................. B21B 22/00
[52] U.S. Cl. ....................................... 72/356; 72/354; 72/359; 72/370
[58] Field of Search ................. 72/354, 356, 358, 359, 72/360, 370, 377

[56] References Cited

U.S. PATENT DOCUMENTS 3,688,717 9/1972 Rudolph .............................. 72/356
4,198,843 4/1980 Spence .................................. 72/370
4,253,323 3/1981 Murakami ............................ 72/377
4,416,141 11/1983 Nippent ............................... 72/356

Primary Examiner—Leon Gilden
Attorney, Agent, or Firm—Charles A. Muserlian

[57] ABSTRACT

A method of producing a metal sleeve having at least one recess open at the end face extending over a portion of the axial length of the sleeve from a cylindrical pipe section comprising (a) inserting a cylindrical pipe section into the annular cavity of a die which cavity is radially greater than the wall thickness of the pipe section, (b) subjecting the pipe section to axial ram pressure whereby a bulge in the central portion of the pipe section occurs with the central portion bearing against the outer limiting wall of the die cavity and the end portions bearing against the inner limiting wall of the die cavity, (c) applying further pressure on the pipe section whereby it fills the die cavity except for a circular depression in the center of the pipe section bore and (d) acting on the resulting pipe section with a second ram with an end face with contours corresponding to the recesses whereby the displaced material from the contours enter into the circular depression of the pipe section to partially fill the same.

1 Claim, 5 Drawing Figures

METAL SLEEVE PRODUCTION

STATE OF THE ART

There are many diversified applications for metal sleeves with at least one recess open at the end face and extending over a portion of the sleeve axial length in many fields of technology. For example, they may be used as coupling sleeves for tooth couplings if they are provided over their circumference with recesses of a serrated type which engage corresponding projections on another coupling part. The production of such sleeves is relatively expensive as the basic form of the sleeve is produced from a tubular blank by chip-removing machining followed by milling to form the serration.

OBJECTS OF THE INVENTION

It is an object of the invention to provide a less-expensive method of producing metal sleeves from cylindrical pipe sections by a non-chipping methods which at most might require slight chip-removing machining.

This and other objects and advantages of the invention will become obvious from the following detailed description.

THE INVENTION

The novel method of the invention of producing a metal sleeve having at least one recess open at the end face extending over a portion of the axial length of the sleeve from a cylindrical pipe section comprises (a) inserting a cylindrical pipe section into the annular cavity of a die which cavity is radially greater than the wall thickness of the pipe section, (b) subjecting the pipe section to axial ram pressure whereby a bulge in the central portion of the pipe section occurs with the central portion bearing against the outer limiting wall of the die cavity and the end portions bearing against the inner limiting wall of the die cavity, (c) applying further pressure on the pipe section whereby it fills the die cavity except for a circular depression in the center of the pipe section bore and (d) acting on the resulting pipe section with a second ram with an end face with contours corresponding to the recesses whereby the displaced material from the contours enter into the circular depression of the pipe section to partially fill the same.

The circular depression in the bore of the pipe section which forms during the said operation due to the occuring bulging thereof, and which per se is regarded as disadvantageous, is advantageously used in the invention for receiving the material displaced during the subsequent shaping process for the formation of the recesses. A circumstance previously felt to be a disadvantage is thus utilized to the advantage of the proposed manufacturing method and it is easy to see that the thus fillable depressions may have any desired shape. It need not by any means be the formation of a kind of serration, but alternately for example a circular groove type depression could be formed, which moreover can have, seen over the circumference, different extent, whether in a radial or in an axial direction. Another advantage of the method of the invention can be seen in that the pipe section used has a thinner wall than the finished sleeve since thinner-wall pipes can often be bought at a better price per kilo than thicker-walled ones.

Figure 5:
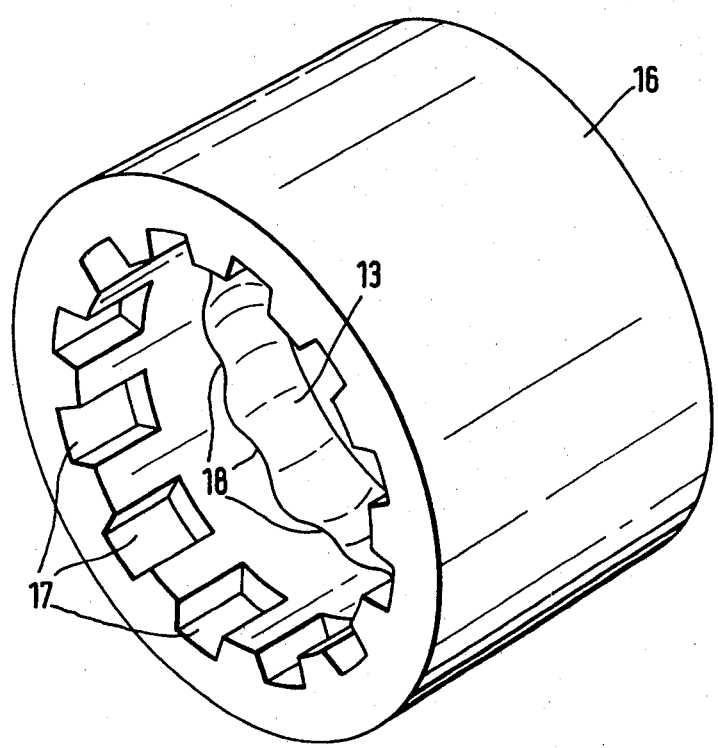

Referring now to the drawings:

FIGS. 1 to 4 show longitudinal sections through a die in four successive process steps and FIG. 5 is a perspective view of a coupling sleeve made by this method.

Figure 2:
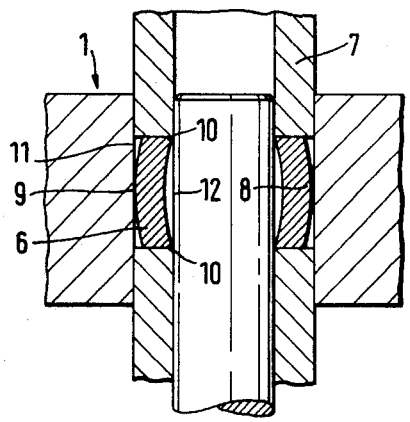
Figure 3:
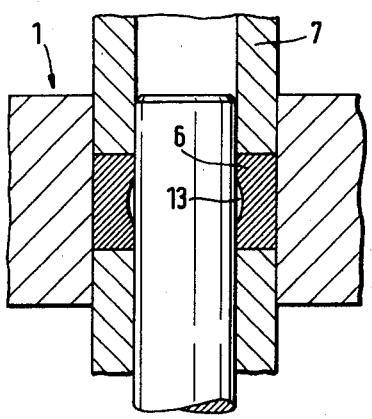
Figure 4:
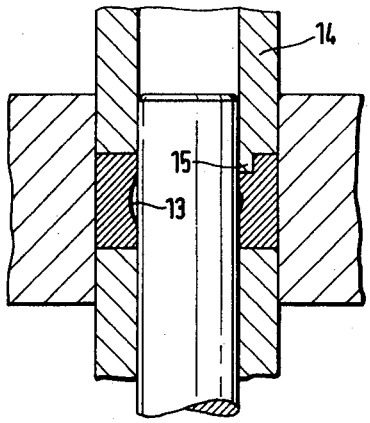

The die 1 shown in FIGS. 1 to 4 consists of the outer element 2, the ring element 3, and the central bolt 4 which define the annular cavity 5, into which in FIG. 1 the cylindrical pipe section 6 which has a smaller radial extent than the cavity 5 is placed. Then as shown in FIG. 2 the ring-shaped ram 7 is introduced into the die and exerts pressure on the pipe section 6 in an axial direction whereby the latter forms a central buldge 8. The central portion 9 of the pipe section 6 will then bear against the outer limiting wall 11 of cavity 5 while its end regions 10 bear against the inner limiting wall 12 of cavity 5. Upon further application of pressure, the pipe section 6 is then bent in such a way that, as FIG. 3 shows, it fills the die cavity except for a circular depression 13 in the center of the bore of the pipe section 6.

Following this, the annular ram 7 is retracted from the die and a second ram 14 is introduced in its place which ram has at its end face a contour 15 corresponding to the desired recesses in the sleeve to be formed. As can be clearly seen from FIG. 4, the material displaced by the contour 15, while partially filling the circular depression 13, penetrates into the latter. While on the left side of FIG. 4 the ram 14 has no contour, so that the circular depression 13 is preserved there, on the right side, it can be seen that the depression 13 has been almost completely filled there by the displaced material.

FIG. 5 shows a finished coupling sleeve 16 with end-face recesses 17 in the manner of a serration. The circular depression 13 visible in the bore of the coupling sleeve 16 shows at its limiting edge toward the recesses 17 the areas 18 at which material has been displaced into the depression 13.

Various modifications of the method of the invention may be made without departing from the spirit or scope thereof and it should be understood that the invention is intended to be limited only as defined in the appended claims.

What we claim is:

1. A method of producing a metal sleeve having at least one recess open at the end face extending over a portion of the axial length of the sleeve from a cylindrical pipe section comprising (a) inserting a cylindrical pipe section into the annular cavity of a die which cavity is radially greater than the wall thickness of the pipe section, (b) subjecting the pipe section to axial ram pressure whereby a bulge in the central portion of the pipe section occurs with the central portion bearing against the outer limiting wall of the die cavity and the end portions bearing against the inner limiting wall of the die cavity, (c) applying further pressure on the pipe section whereby it fills the die cavity except for a circular depression in the center of the pipe section bore and (d) acting on the resulting pipe section with a second ram with an end face contours corresponding to the recesses whereby the displaced material from the contours enter into the circular depression of the pipe section to partially fill the same.

* * * * *